US 009738144 B2

United States Patent
Kurita et al.

(10) Patent No.: US 9,738,144 B2
(45) Date of Patent: Aug. 22, 2017

(54) SUNROOF STRUCTURE FOR WHEELED VEHICLE

(71) Applicant: HONDA MOTOR CO., LTD., Tokyo (JP)

(72) Inventors: Makoto Kurita, Wako (JP); Yoshikazu Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/114,919

(22) PCT Filed: Dec. 11, 2014

(86) PCT No.: PCT/JP2014/082807
§ 371 (c)(1),
(2) Date: Jul. 28, 2016

(87) PCT Pub. No.: WO2015/114962
PCT Pub. Date: Aug. 6, 2015

(65) Prior Publication Data
US 2016/0347158 A1  Dec. 1, 2016

(30) Foreign Application Priority Data

Jan. 30, 2014 (JP) .................. 2014-015296

(51) Int. Cl.
*B60J 7/22* (2006.01)
*B60J 7/16* (2006.01)
(Continued)

(52) U.S. Cl.
CPC ........... *B60J 7/1642* (2013.01); *B60J 7/0046* (2013.01); *B60J 7/11* (2013.01); *B60J 7/22* (2013.01)

(58) Field of Classification Search
CPC ........................................................ B60J 7/22
(Continued)

(56) References Cited

U.S. PATENT DOCUMENTS 4,089,557 A * 5/1978 Leiter .................... B60H 1/262
296/221
4,709,959 A * 12/1987 Paerisch ................ B60J 7/0046
296/217
(Continued)

FOREIGN PATENT DOCUMENTS

| JP | 61-129324 | 6/1986 |
|---|---|---|
| JP | 63-110022 | 5/1988 |
| JP | 4-9689 | 2/1992 |

OTHER PUBLICATIONS

International Search Report, Date of mailing: Feb. 10, 2015 (Feb. 10, 2015).

*Primary Examiner* — Dennis H Pedder
(74) *Attorney, Agent, or Firm* — Rankin, Hill & Clark LLP

(57) ABSTRACT

A sunroof structure for a wheeled vehicle includes a fixed roof that forms a top portion of the wheeled vehicle, a movable roof that opens and closes a front opening portion which is provided in the fixed roof, and a left side lip that is provided on a left side portion of the movable roof. The left side lip is provided to be spaced apart from the fixed roof when the movable roof is in a tilt-up state. This left side lip includes a lip main body that protrudes downwards from the left side portion of the movable roof and a projecting portion that projects transversely outwards from a lower end of the lip main body.

11 Claims, 13 Drawing Sheets

(51) Int. Cl.
*B60J 7/00* (2006.01)
*B60J 7/11* (2006.01)

(58) Field of Classification Search
USPC .......................................................... 296/217
See application file for complete search history.

(56) References Cited

U.S. PATENT DOCUMENTS

| | | | |
|---|---|---|---|
| 5,451,091 A * | 9/1995 | Schleicher | B60J 7/0046 296/217 |
| 6,030,031 A | 2/2000 | Martinus Lenkens | |
| 8,136,872 B2 * | 3/2012 | Nellen | B60J 7/024 296/221 |

* cited by examiner

SUNROOF STRUCTURE FOR WHEELED VEHICLE

TECHNICAL FIELD

The present invention relates to a sunroof structure for a wheeled vehicle in which an opening portion is provided in a roof of a wheeled vehicle, a movable roof is supported in the opening portion, and the opening portion is allowed to be opened and closed by the movable roof.

BACKGROUND ART

There is known a sunroof structure for a wheeled vehicle in which a top portion of a wheeled vehicle is formed by a roof (a fixed roof), an opening portion is formed in the roof, a movable roof (a cover) is supported in the opening portion so as to be opened and closed, and strips are provided on both transverse side portions of the movable roof.

The strips are provided in such a state that the strips are in contact with both side portions of the opening portion (that is, the roof). Thus, with the movable roof left opened, spaces defined between the side portions of the opening portion and the movable roof are kept sealed up by the strips (for example, refer to patent literature 1).

In the sunroof structure disclosed in patent literature 1, however, the movable roof is opened and closed in an up-to-down or vertical direction with the strips kept in contact with the side portions of the opening portion. Thus, in opening or closing the movable roof, the movable roof slides with the strips kept in contact with the side portions of the opening portion, whereby frictional resistance is generated between the side portions of the opening portion and the strips by the sliding movable roof.

Owing to this, in opening and closing the movable roof, an actuator motor needs to output a great operation force.

There is also known a sunroof structure for a wheeled vehicle in which a movable roof (a sliding roof) is supported in an opening portion formed in a top portion of a wheeled vehicle so as to be opened and closed, and rubber members are provided on both side portions of the movable roof. The rubber members each have a lower half portion having a substantially L-shaped section. With the movable roof left closed, the rubber members are accommodated in guide grooves in a fixed roof at the lower half portions each having the substantially L-shaped section.

In this state, the lower half portions of the rubber members are kept in a non-contact state relative to the guide grooves therein.

Consequently, in opening or closing the movable roof, it is possible to restrain frictional resistance from being generated between the rubber members and the guide grooves, thereby making it possible to keep the operation force of an actuator motor to a lower level (for example, refer to patent literature 2).

In the sunroof structure disclosed in patent literature 2, however, the lower half portions having the substantially L-shaped section which are provided on the rubber members are kept in the non-contact state relative to the guide grooves. Thus, it is considered that while the wheeled vehicle is running, running air flows around to the lower half portions having the substantially L-shaped section.

Here, as a result of the lower half portions of the rubber members being formed so as to have the substantially L-shaped section, a projecting angular portion (an edge) is formed individually on lower end portions of the rubber members. Thus, the running air that flows around to the lower half portions of the rubber members is allowed to easily move away from the lower half portions of the rubber members, and thereby wind noise is generated by the running air moving away from the lower half portions.

In addition, in the sunroof structure disclosed in patent literature 2, the lower half portions of the rubber members which each have the substantially L-shaped section are accommodated in the guide grooves in the non-contact state relative to the guide grooves. Owing to this, the lower half portions of the rubber members are restricted in shape by the guide grooves, this preventing the enhancement in flexibility in relation to the design thereof.

RELATED ART LITERATURE

Patent Literature

Patent Literature 1: JP-B-H4-9689
Patent Literature 2: JP-A-S63-110022

SUMMARY OF THE INVENTION

Problem that the Invention is to Solve

A problem that the invention is to solve is to provide a sunroof structure for a wheeled vehicle that can reduce an operation force with which a movable sunroof is opened and closed, that can suppress the generation of wind noise, and that can enhance the flexibility of design.

Means for Solving the Problem

According to an invention of claim 1, there is provided a sunroof structure for a wheeled vehicle, including:
a fixed roof that forms a top portion of the wheeled vehicle;
a movable roof that opens and closes an opening portion which is provided in the fixed roof; and
a side lip that is provided on a transverse side portion of the movable roof and is spaced apart from the fixed roof when the movable roof is in a tilt-up state,
wherein the side lip includes:
a main body that protrudes downwards from the transverse side portion of the movable roof; and
a projecting portion that projects transversely outwards from a lower end of the lip main body.

According to an invention of claim 2, it is preferable that in the projecting portion, a projecting angular portion is removed from a transversely outer side projecting surface, and the projecting surface is formed smoothly to have a substantially curved section.

According to an invention of claim 3, it is preferable that the lip main body protrudes further downwards than an upper surface of the fixed roof when the movable roof is in the tilt-up state, and that
in the projecting portion, an upper surface of the projecting portion is situated below the upper surface of the fixed roof when the movable roof is in the tilt-up state.

According to an invention of claim 4, it is preferable that the lip main body includes:
a lip front-side portion that has a front lower end which extends substantially horizontally in a longitudinal direction of a vehicle body when the movable roof is in the tilt-up state, and
a lip rear-side portion that has a rear lower end which extends from a rear end of the front lower end towards the rear of the vehicle body and upwards along a rising gradient when the movable roof is in the tilt-up state, and that the projecting portion is provided to extend along the front lower end and the rear lower end.

According to an invention of claim 5, it is preferable that in the lip front-side portion, the rear end of the front lower end is situated below an upper surface of the fixed roof when the movable roof is in the tilt-up state.

According to an invention of claim 6, it is preferable that the projecting portion is provided continuously from a front end of the front lower end to a rear end of the rear lower end.

According to an invention of claim 7, it is preferable that the projecting portion has a rear projecting portion which is provided on the rear lower end, and that the rear projecting portion extends continuously from the rear end of the front lower end to a position where lies higher than a rear edge of the opening portion when the movable roof is in the tilt-up state.

Advantage of the Invention

According to the invention of claim 1, the side lip is provided on the transverse side portion of the movable roof, and the side lip is spaced apart from the fixed roof. Thus, the side lip is kept in a non-contact state relative to the fixed roof.

This restrains frictional resistance from being generated between the side lip and the fixed roof when the movable roof is opened or closed, thereby making it possible to reduce the operation force required to open or close the movable roof to a lower level.

Further, the projecting portion is provided to project transversely outwards from the lower end of the lip main body. Thus, running air that is introduced from the lip main body to the lower end can be prevented from flowing around into a passenger compartment side from the lower end of the lip main body by the projecting portion.

This prevents the running air from flowing away from the lower end of the lip main body to thereby suppress the generation of wind noise.

In addition, unlike the prior art sunroof structure, the side lip does not have to be kept in the non-contact state relative to the guide groove in the fixed roof while being accommodated in the guide groove.

This prevents the side lip from being restricted in shape by the guide groove, thereby making it possible to enhance the flexibility in designing the same.

According to the invention of claim 2, the edge (the projecting angular portion) is removed from the projecting surface of the projecting portion, and the projecting surface is formed smoothly to have the substantially curved section. Thus, even though part of running air that is introduced to the projecting portion flows around the lower end of the lip main body, the running air that flows therearound is allowed to flow smoothly along the projecting surface of the projecting portion.

Namely, the running air that is introduced to the projecting portion can be prevented from flowing away from the projecting surface.

In this way, by preventing the running air from flowing away from the projecting surface, the generation of wind noise can be suppressed which would otherwise be caused by the running air that is introduced to the projecting portion.

According to the invention of claim 3, when the movable roof is in the tilt-up state, the lip main body protrudes further downwards than the upper surface of the fixed roof, and further, the upper surface of the projecting portion is situated below the upper surface of the fixed roof.

Thus, running air that flows along the upper surface of the fixed roof towards the side lip can be received by the lip main body. Further, the running air that is received by the lip main body can be received by the upper surface of the projecting portion. By adopting this configuration, the running air that flows towards the side lip can be prevented from flowing around into the passenger compartment side from the lower end of the lip main body by the projecting portion in an ensured fashion, thereby making it possible to suppress the generation of wind noise more preferably.

According to the invention of claim 4, the lip main body has the lip front-side portion and the lip rear-side portion. Further, when the movable roof is in the tilt-up state, the front lower end of the lip front-side portion extends substantially horizontally, and the rear lower end of the lip rear-side portion extends from the front lower end to the rear of the vehicle body and upwards along the rising gradient.

The height-wise dimension of the lip rear-side portion can preferably be restrained from being increased by causing the rear lower end of the lip rear-side portion to extend from the front lower end to the rear of the vehicle body and upwards along the rising gradient. Thus, when the movable roof is closed to the closed state, the lip rear-side portion can be prevented from intruding largely into the passenger compartment side, thereby making it possible to prevent the interference of the lip rear-side portion with the frame material of the fixed roof.

In addition, the lip main body has the lip front-side portion and the lip rear-side portion. Thus, when the movable roof is in the tilt-up state, running air that flows from the upper surface of the fixed roof towards the side lip can be received by the lip front-side portion and the lip rear-side portion with good efficiency.

Further, the projecting portion is provided to extend over both the lower ends of the lip front-side portion (the front lower end) and the lip rear-side portion (the rear lower end). Thus, the running air that is received by the lip front-side portion and the lip rear-side portion can be received by the projecting portion with good efficiency.

By adopting this configuration, the miming air that flows towards the side lip can be prevented from flowing around into the passenger compartment side from the lower end of the lip main body by the projecting portion in an ensured fashion.

Here, the front lower end of the lip front-side portion extends in the longitudinal direction of the vehicle body, and the rear lower end of the lip rear-side portion extends to the rear of the vehicle body and upwards along the rising gradient, whereby a boundary portion between the lip front-side portion and the lip rear-side portion is formed into an angular shape (an edge shape) that projects downwards.

Owing to this, it is considered that vibrations are generated at the boundary portion as a result of running air being received by the boundary portion where the angular shape (the edge shape) is formed.

Then, according to the invention of claim 4, the projecting portion is provided to extend along the lip front-side portion (front lower end) and the lip rear-side portion (rear lower end). Thus, the rigidity of the boundary portion can be enhanced by reinforcing the boundary portion that is formed into the angular shape (the edge shape) by the projecting portion.

By doing so, when running air is received by the boundary portion where the angular shape (the edge shape) is formed, it is possible to restrain the boundary portion from being vibrated by running air.

Further, by forming the boundary portion into the angular shape (the edge shape), for example, with no projecting portion being provided at the boundary portion, running air that reaches the boundary portion tends to flow easily away from the boundary portion.

Then, according to the invention of claim 4, the projecting portion is provided to extend along the lip front-side portion (front lower end) and the lip rear-side portion (rear lower end), whereby the projecting portion can be provided at the boundary portion. Thus, running air that reaches the boundary portion can be received by the projecting portion.

As a result of this, running air can be prevented from flowing away from the boundary portion by the projecting portion, thereby making it possible to suppress the generation of wind noise at the boundary portion.

According to the invention of claim 5, the rear end of the lip front-side portion (the front lower end) is situated below the upper surface of the fixed roof when the movable roof is in the tilt-up state. Thus, a lower end portion of the angular shape (the edge shape) can be disposed below the upper surface of the fixed roof.

By doing so, running air that flows along the upper surface of the fixed roof is allowed to flow around the lower end portion of the boundary portion that is formed into the angular shape so as to prevent the running air from flowing against the lower end portion, thereby making it possible to suppress the generation of wind noise at the boundary portion.

According to the invention of claim 6, the projecting portion is provided to extend continuously from the front end of the lip front-side portion (the front lower end) to the rear end of the lip rear-side portion (the rear lower end). Thus, the whole area of the lower end of the side lip can be reinforced by the projecting portion, thereby making it possible to enhance the rigidity of the whole area of the lower end of the side lip.

By doing so, when running air flows against the side lip, the generation of self-excited vibration can be suppressed which would otherwise be caused in the side lip by the running air.

According to the invention of claim 7, when the movable roof is in the tilt-up state, the rear projecting portion extends continuously from the rear end of the front lower end to the position lying higher than the rear edge of the opening portion. The rear projecting portion is provided on the lip rear-side portion (the rear lower end).

Thus, running air that is introduced to the lip rear-side portion can be guided to the position lying higher than the rear edge of the opening portion by the rear projecting portion, whereby the running air is allowed to flow around the rear edge of the opening portion. By doing so, it is possible to suppress the generation of collision noise that would otherwise be caused as a result of the running air that is introduced to the lip rear-side portion flowing against the rear edge of the opening portion.

MODE FOR CARRYING OUT THE INVENTION

A best mode for carrying out the invention will be described below based on the accompanying drawings. "front (FR)," "rear (Rr)," "left (L)," and "right (R)" represent directions resulting when seen from a driver.

Example

A sunroof structure 10 for a wheeled vehicle according to an embodiment will be described.

Figure 1:
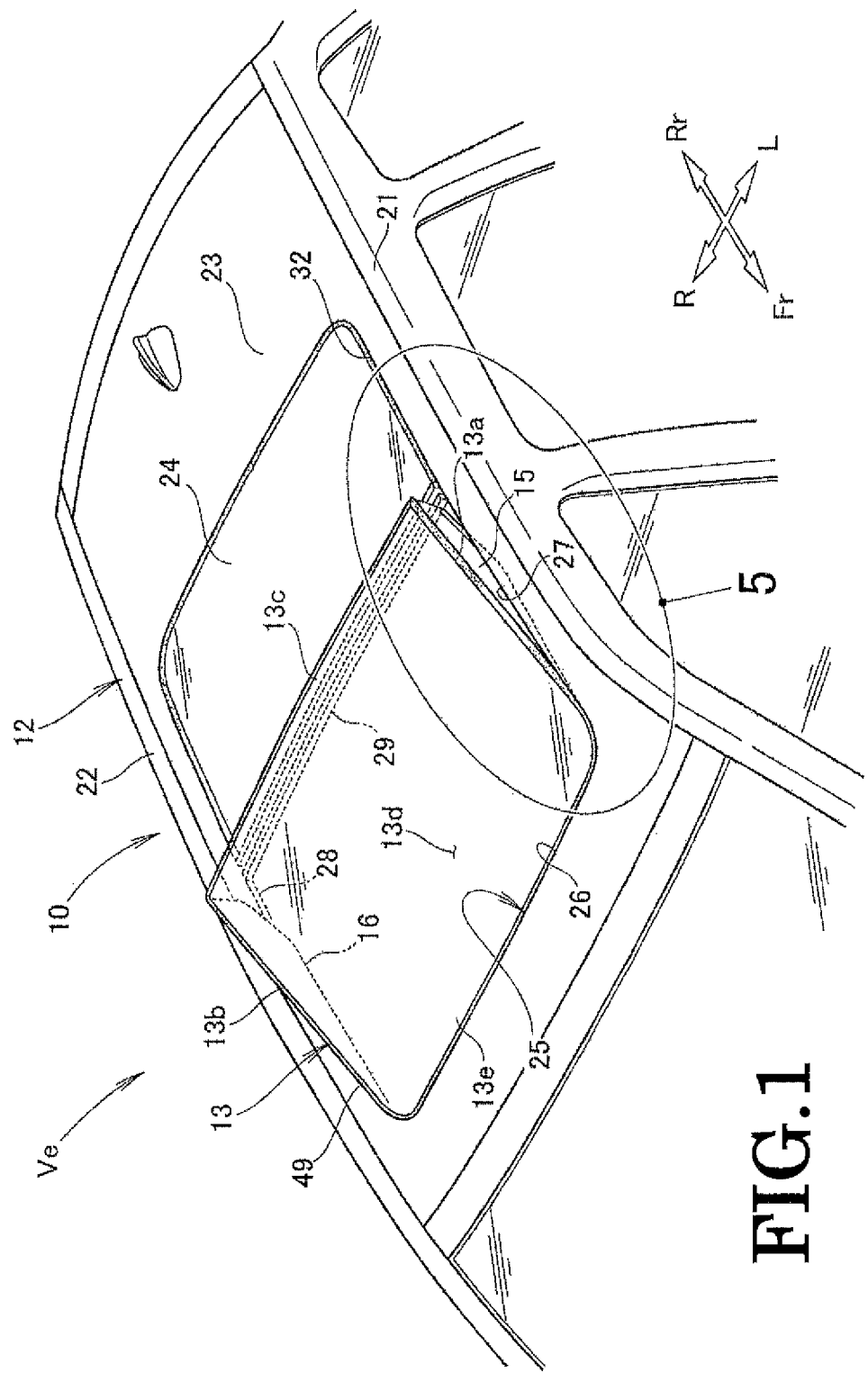
FIG. 1 is a perspective view showing a wheeled vehicle that includes a sunroof structure according to the invention.
Figure 2:
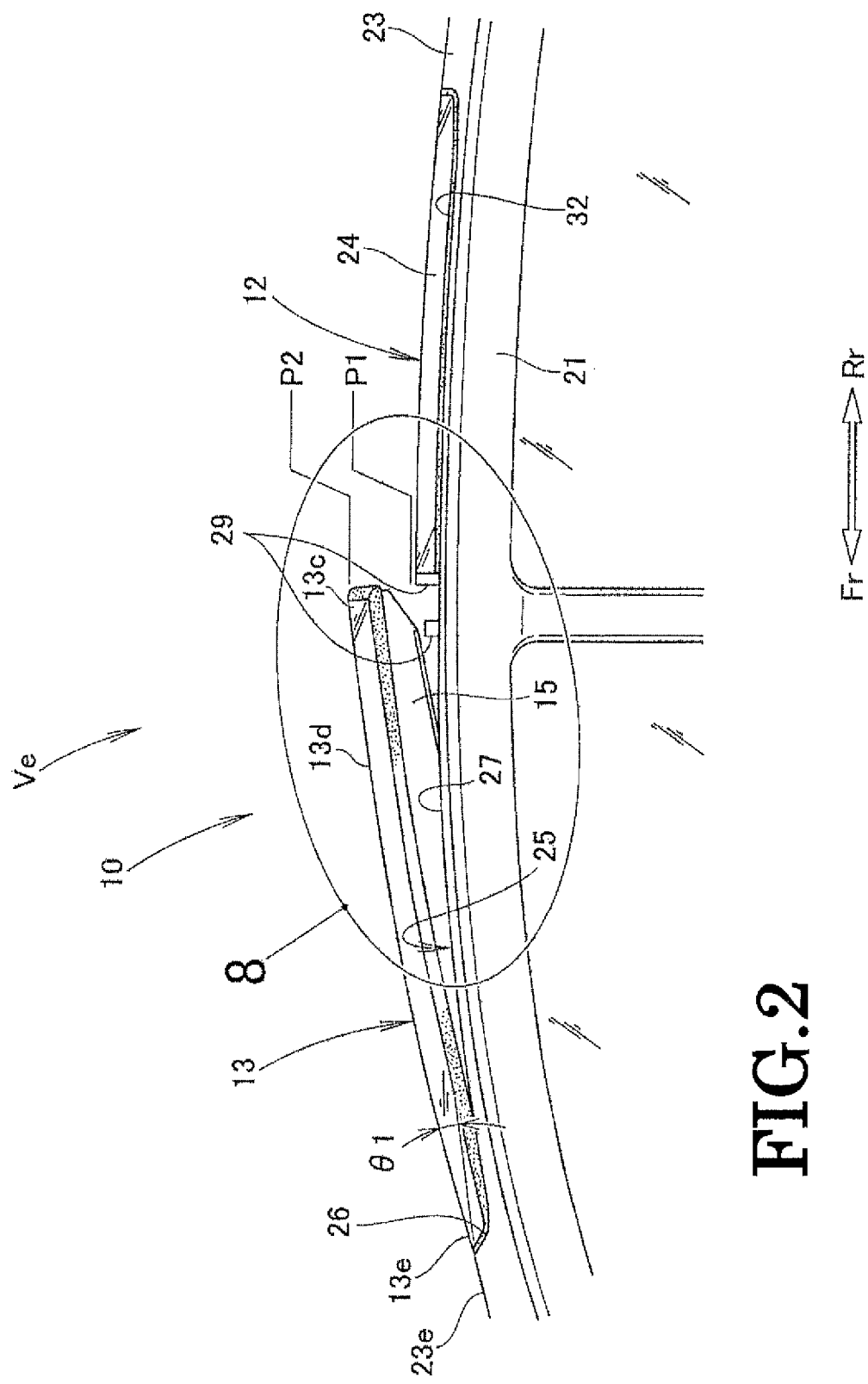
FIG. 2 is a side view showing the sunroof structure shown in FIG. 1.

As shown in FIGS. 1, 2, the sunroof structure for a wheeled vehicle 10 includes a roof (a fixed roof) 12 that forms a top portion of a wheeled vehicle Ve, a movable roof 13 that is provided in the roof 12, a left side lip 15 that is provided on a left side portion (a transverse side portion) 13a of the movable roof 13 and a right side lip 16 that is provided on a right side portion (a transverse side portion) 13b of the movable roof 13.

The left side lip 15 and the right side lip 16 are laterally symmetrical members, and in the following description, the left side lip 15 will be described while the description of the right side lip 16 will be omitted here.

The roof 12 includes a left side roof rail 21 that forms a left side portion of the top portion, a right side roof rail 22 that forms a right side portion of the top portion, a roof main body 23 that is provided between the left and right side roof rails 21, 22, and a roof glass 24 that is provided in the roof main body 23.

In the roof main body 23, a substantially rectangular front opening portion 25 is provided at a front portion thereof, and a substantially rectangular rear opening portion 32 is provided behind the front opening portion 25 in relation to a front-to-rear or longitudinal direction of a vehicle body. The roof glass 24 having a substantially rectangular shape when seen from thereabove is fitted in the rear opening portion 32.

The front opening portion 25 includes a front edge 26 that extends in a vehicle's width or transverse direction, a left side edge 27 that extends from a left end portion of the front edge 26 in the longitudinal direction of the vehicle body, a right side edge 28 that extends from a right end portion of the front edge 26 in the longitudinal direction of the vehicle body, and a rear edge 29 that connects a rear end portion of the left side edge 27 and a rear end portion of the right side edge 28 together.

The front opening portion 25 is opened into the substantially rectangular shape by the front edge 26, the left side edge 27, the right side edge 28 and the rear edge 29. The movable roof 13 is provided in this front opening portion 25.

The movable roof 13 is a glass sunroof that is formed into a substantially rectangular shape when seen from thereabove so as to close the front opening portion 25. This movable roof 13 is supported in the front opening portion 25 of the roof main body 23 via a roof opening and closing device 34 (refer to FIG. 3).

By operating the roof opening and closing device 34, a rear end portion 13c of the movable roof 13 is moved in an up-to-down or vertical direction (so-called, is tilt-moved) between a closed position P1 (refer to FIG. 4) and an open position P2.

Figure 3:
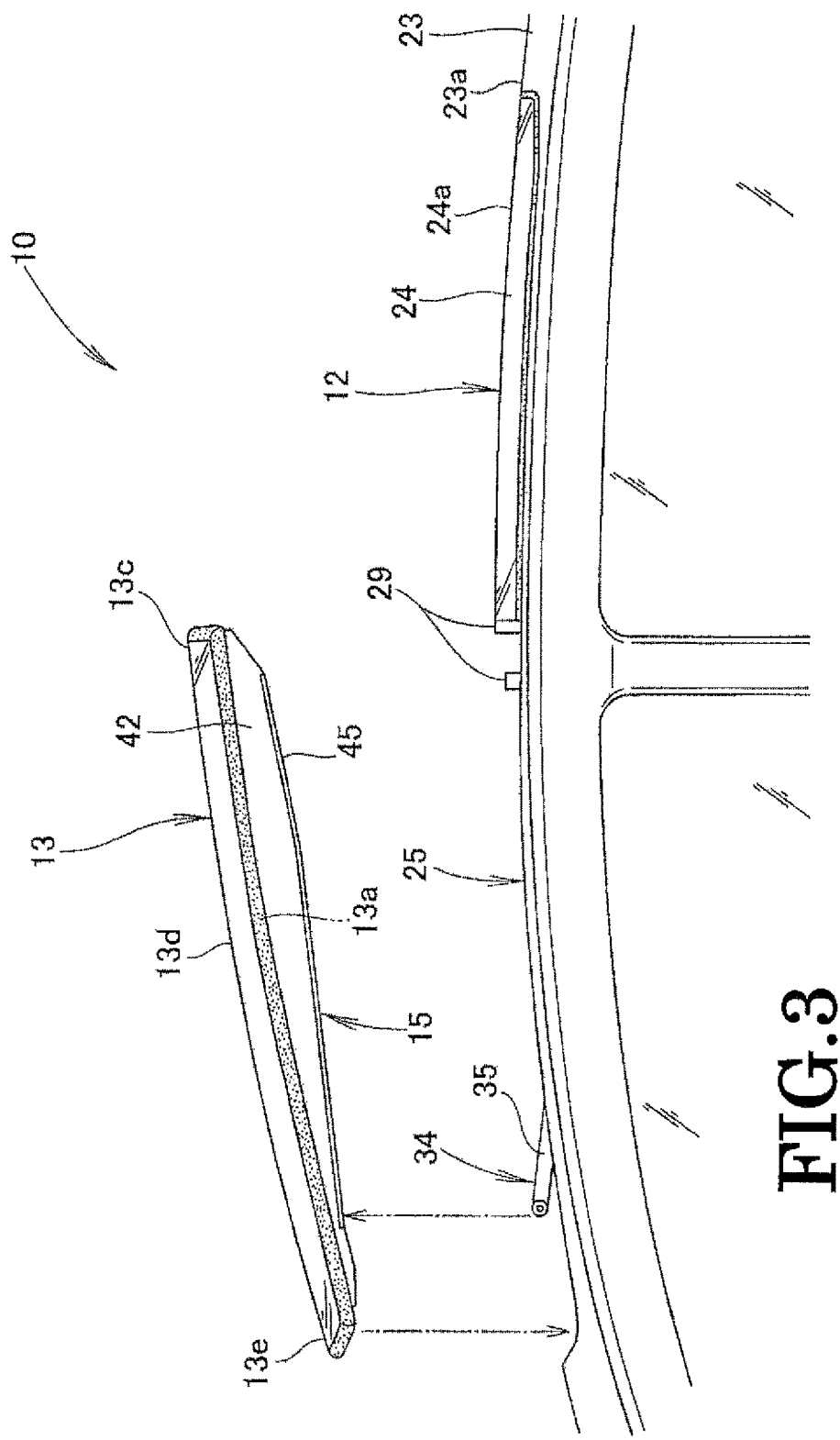
FIG. 3 is a side view showing a state in which a movable roof is detached from the sunroof structure shown in FIG. 2.
Figure 4:
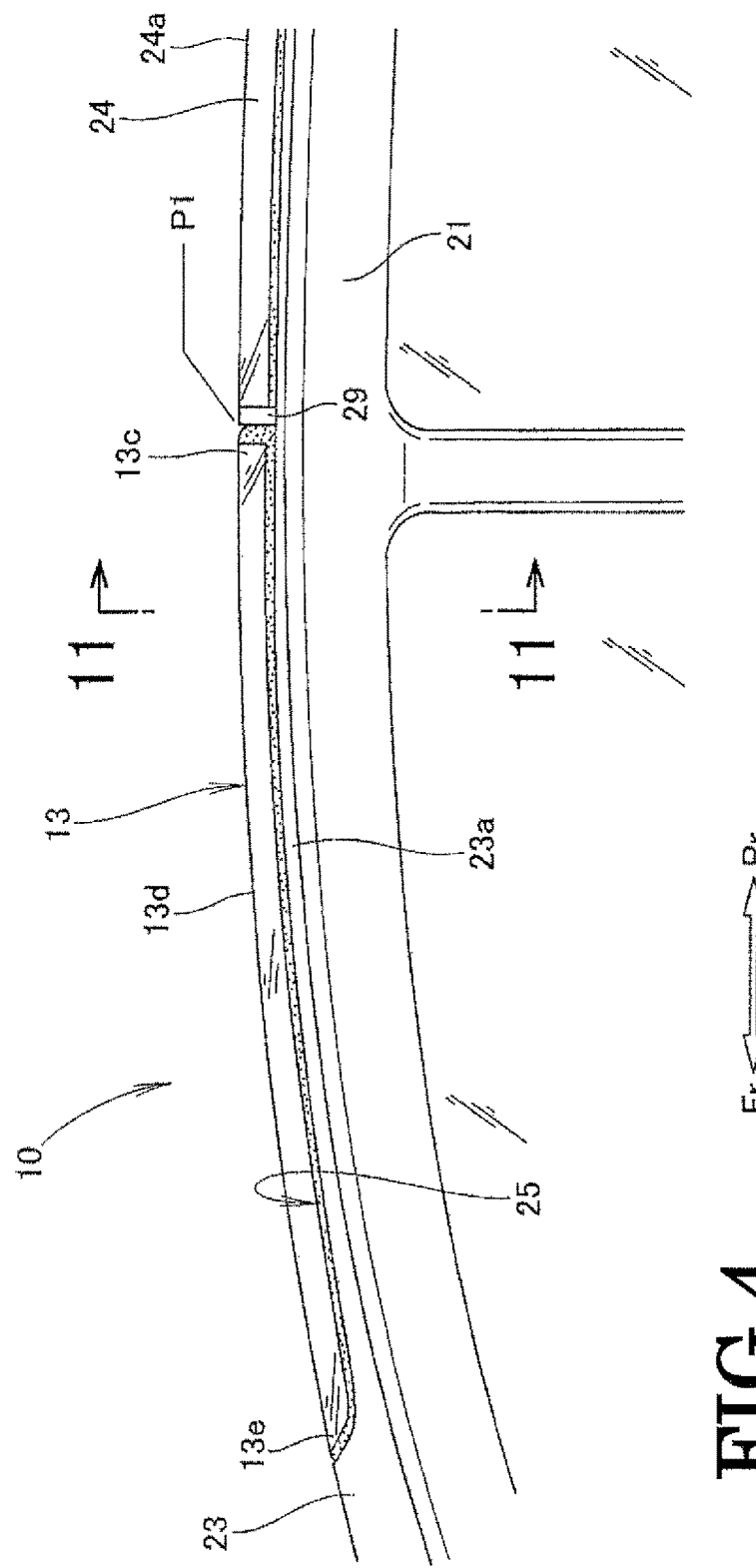
FIG. 4 is a side view showing a state in which the movable roof of the sunroof structure shown in FIG. 2 is disposed in a closed position.

As shown in FIGS. 3, 4, the movable roof 13 is disposed in the closed position P1 as a result of a link mechanism 35 of the roof opening and closing device 34 being folded up. In this state, an upper surface 13d of the movable roof 13 is disposed substantially level with an upper surface 23a of the roof main body 23 and an upper surface 24a of the roof glass 24, and the front opening portion 25 is closed by the movable roof 13.

On the other hand, as shown in FIGS. 2, 3, the movable roof 13 is disposed on the open position P2 as a result of the link mechanism 35 of the roof opening and closing device 34 being expanded. In this state, with a front end portion 13e of the movable roof 13 held at the same height as the upper surface 23a of the roof main body 23, a rear end portion 13c of the movable roof 13 is disposed above the upper surface 23a of the roof main body 23 and the upper surface 24a of the roof glass 24.

With the movable roof 13 disposed in the open position P2, the movable roof 13 is disposed in a tilt-up state so that the upper surface 13d is inclined from the front end portion 13e towards the rear end portion 13c along a rising gradient of an inclined angle θ1.

The front opening portion 25 is opened by the movable roof 13 being disposed in the open position P2 (that is, in the tilt-up state).

Figure 5:
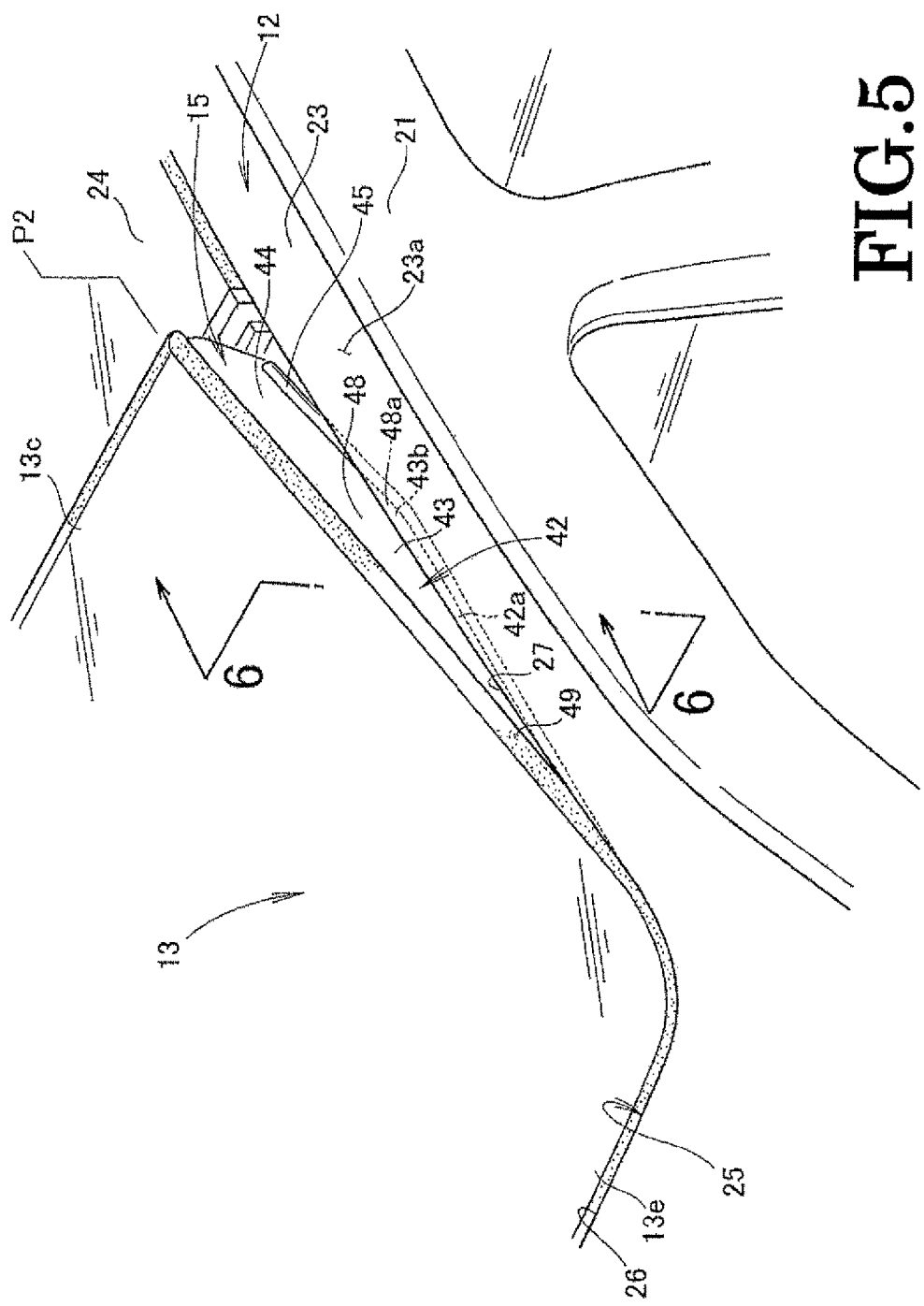
FIG. 5 is an enlarged view of a portion denoted by reference numeral 5 in FIG. 1.
Figure 6:
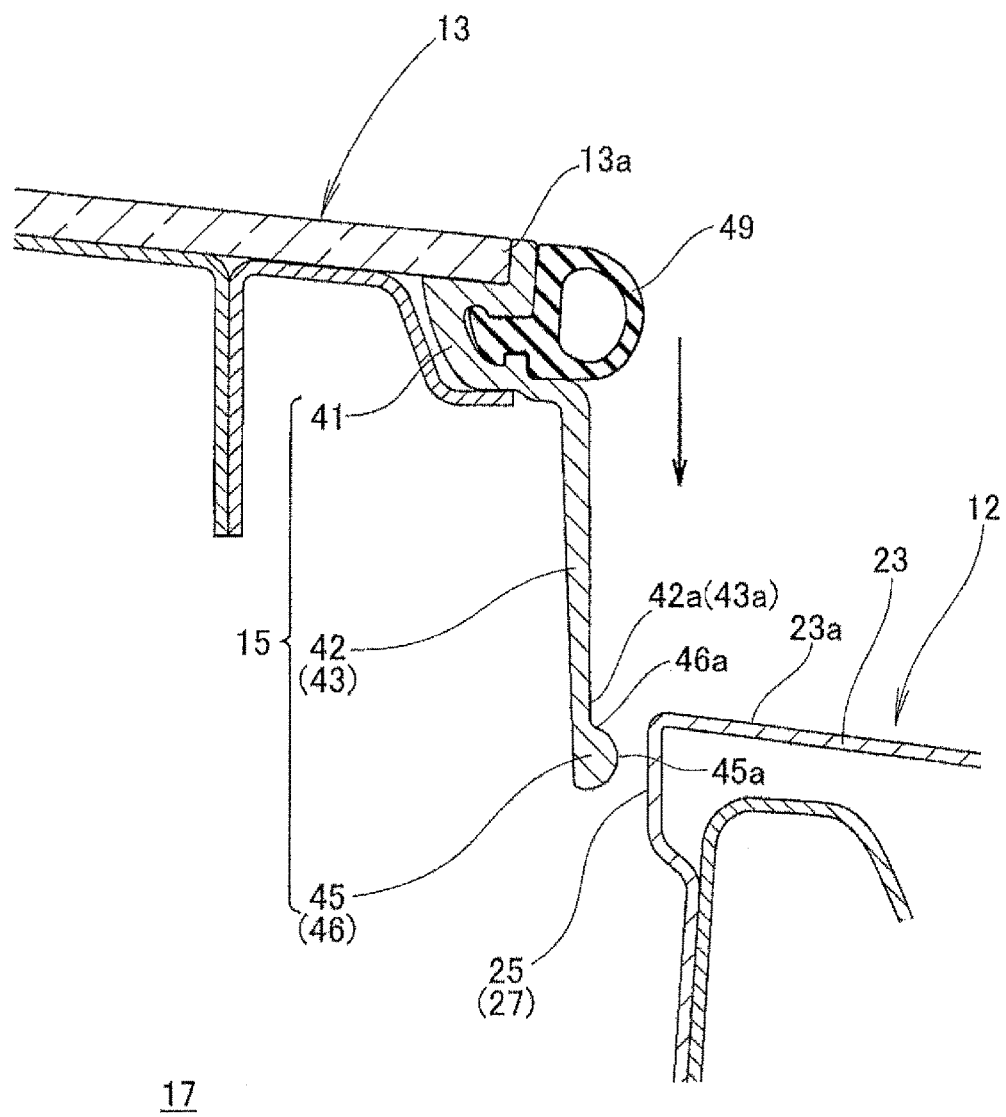
FIG. 6 is a sectional view taken along a line 6-6 in FIG. 5.

As shown in FIGS. 5, 6, the left side lip 15 is provided on the left side portion 13a of the movable roof 13, The left side lip 15 is a member that is formed (molded) of, for example, a resin material.

This left side lip 15 includes a lip base portion 41 that is provided on the left side portion 13a of the movable roof 13, a lip main body 42 that protrudes downwards into a plate shape from the lip base portion 41, and a projecting portion 45 that projects transversely outwards from a lower end 42a of the lip main body 42.

A seal material 49 is provided on a transversely outer side of the lip base portion 41. The seal material 49 is provided along a full circumferential edge of the movable roof 13 (refer to FIG. 1, too).

Figure 7:
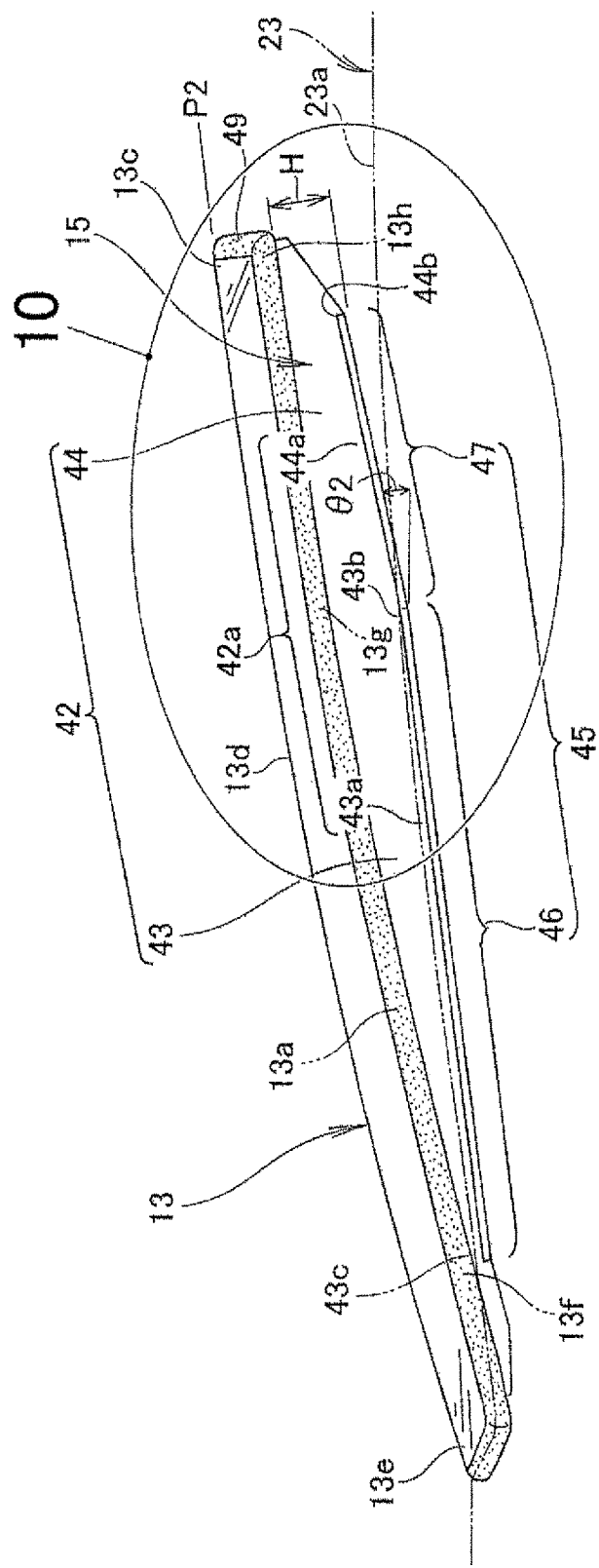
FIG. 7 is a side view showing the movable roof shown in FIG. 3.

As shown in FIG. 7, the lip main body 42 is provided on the lip base portion 41 (refer to FIG. 6) and protrudes downwards into a plate shape from the left side portion 13a of the movable roof 13.

This lip main body 42 includes a plate shaped lip front-side portion 43 that protrudes downwards from a portion of the left side portion 13a that lies between a front end portion 13f and a portion 13g lying closer to a rear end or a closer-to-rear-end portion 13g of the left side portion 13a and a plate shaped lip rear-side portion 44 that protrudes downwards from a portion of the left side portion 13a that lies between the closer-to-rear-end portion 13g and a rear end portion 13h of the left side portion 13a.

The lip front-side portion 43 has a front lower end 43a that extends substantially horizontally in the longitudinal direction of the vehicle body when the movable roof 13 is in the tilt-up state. When the movable roof 13 is in the tilt-up state, a rear end 43b of the front lower end 43a is disposed below the upper surface (an upper surface of the roof 12) 23a of the roof main body 23 (also, refer to FIG. 5).

Namely, the lip front-side portion 43 protrudes (is suspended perpendicularly to protrude) further downwards than the upper surface 23a of the roof main body 23 when the movable roof 13 is in the tilt-up state.

The lip rear-side portion 44 has a rear lower end 44a that extends to the rear of the vehicle body from the rear end 43b of the front lower end 43a and upwards along a rising gradient of an inclined angle θ2 when the movable roof 13 is in the tilt-up state. When the movable roof 13 is in the tilt-up state, the lip rear-side portion 44 is disposed above the upper surface 23a of the roof main body 23.

Returning to FIG. 5, when the movable roof 13 is in the tilt-up state, the lip front-side portion 43 and the lip rear-side portion 44 of the left side lip 15 are disposed above the upper surface 23a of the roof main body 23.

Thus, running air that flows from the upper surface 23a of the roof main body 23 towards the left side lip 15 can be received by the lip front-side portion 43 and the lip rear-side portion 44 with good efficiency.

As shown in FIGS. 6, 7, the projecting portion 45 projects transversely outwards from the lower end 42a of the lip main body 42. Thus, running air that is introduced from the lip main body 42 to the lower end 42a can be prevented from flowing around into a passenger compartment 17 side from the lower end 42a of the lip main body 42 by the projecting portion 45.

This prevents the running air from flowing away from the lower end 42a of the lip main body 42 at the projecting portion 45 to thereby suppress the generation of wind noise.

In the projecting portion 45, an edge (a projecting angular portion) is removed from a transversely outer projecting surface 45a thereof, and the projecting surface 45a is formed smoothly to have a substantially curved section (for example, an arc-like shape). Thus, running air that is guided to the projecting portion 45 is allowed to flow smoothly along the projecting surface 45a of the projecting portion 45.

Namely, the running air that is guided to the projecting portion 45 can be prevented from flowing away from the projecting surface 45a. In this way, by preventing the running air guided to the projecting portion 45 from flowing away from the projecting surface 45a, it is possible to restrain the running from generating wind noise.

This projecting portion 45 has a front projecting portion 46 that is provided at the front lower end 43a of the lip front-side portion 43 and a rear projecting portion 47 that is provided at a rear lower end 44a of the lip rear-side portion 44. Namely, the projecting portion 45 is provided to extend continuously from a front end 43c of the front lower end 43a to a rear end 44b of the rear lower end 44a and is also provided to extend along the front lower end 43a and the rear lower end 44a.

By providing the projecting portion 45 to extend continuously from the front end 43c of the front lower end 43a to the rear end 44b of the rear lower end 44a, the whole area of the lower end 42a of the lip main body 42 is reinforced by the projecting portion 45, thereby making it possible to enhance the rigidity of the left side lip 15.

By doing so, when running air flows against the left side lip 15, the generation of self-excited vibration can be suppressed which would otherwise be caused in the left side lip 15 by the running air.

Further, the projecting portion 45 is provided to extend along the front lower end 43*a* and the rear lower end 44*a*, running air received by the lip front-side portion 43 and the lip rear-side portion 44 can be received by the projecting portion 45 with good efficiency.

By adopting this configuration, the running air that flows towards the left side lip 15 can be prevented from flowing around into the passenger compartment 17 side from the lower end 42*a* of the lip main body 42 by the projecting portion 45 in an ensured fashion.

In particular, in the front projecting portion 46 of the projecting portion 45, an upper surface 46*a* (of the projecting portion) is situated below the upper surface 23*a* of the roof main body 23 when the movable roof 13 is opened to the open position P2. Further, when the movable roof 13 is opened to the open position P2, the lip front-side portion 43 (in particular, the front lower end 43*a*) protrudes (is suspended perpendicularly to protrude) further downwards than the upper surface 23*a* of the roof main body 23.

Thus, running air that flows along the upper surface 23*a* of the roof main body 23 towards the left side lip 15 can be received by the lip main body 42 (specifically, the lip front-side portion 43). Further, the running are that is received by the lip front-side portion 43 can be received by the upper surface 46*a* of the front projecting portion 46.

By adopting this configuration, the running air that flows towards the left side lip 15 can be prevented from flowing around into the passenger compartment 17 side from the front lower end 43*a* of the lip front-side portion 43 by the front projecting portion 46, thereby making it possible to suppress the generation of wind noise preferably.

Figure 8:
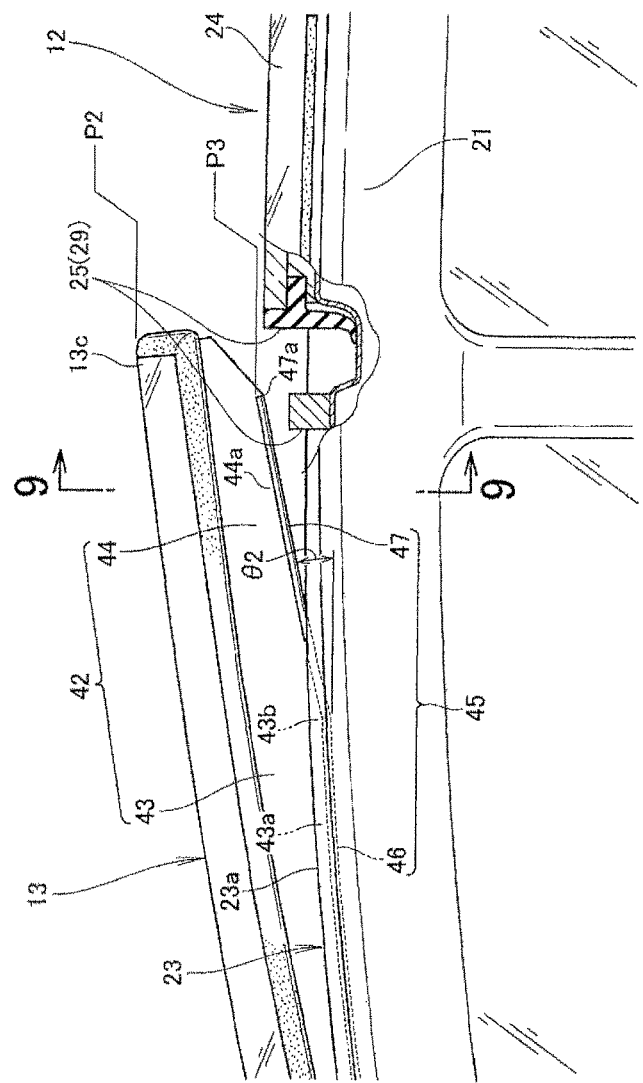
FIG. 8 is an enlarged view of a portion denoted by reference numeral 8 in FIG. 2.
Figure 9:
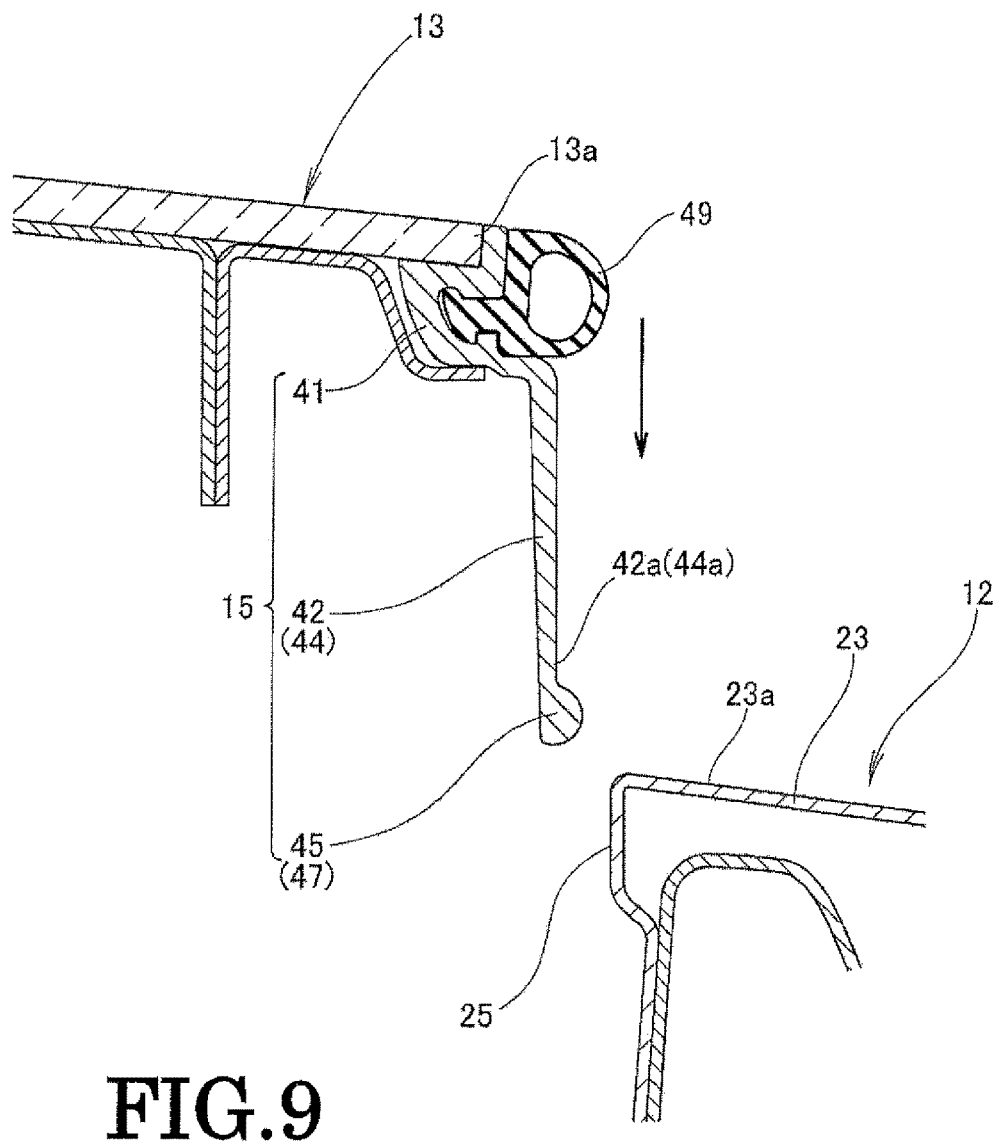
FIG. 9 is a sectional view taken along a line 9-9 in FIG. 8.

As shown in FIGS. 8, 9, the rear projecting portion 47 of the projecting portion 45 extends towards the rear of the vehicle body along the rising gradient of the inclined angle θ2 (refer to FIG. 7) when the movable roof 13 is opened to the open position P2.

By doing so, a rear end 47*a* of the rear projecting portion 47 is disposed in a position P3 that lies higher than the rear edge 29 of the roof 12 (specifically, the front opening portion 25).

Namely, the rear projecting portion 47 extends along the rising gradient of the inclined angle θ2 from the rear end 43*b* of the front lower end 43*a* to the position P3 that lies higher than the rear edge 29 of the front opening portion 25. The rear projecting portion 47 is provided at the rear lower end 44*a* of the lip rear-side portion 44.

Thus, running air that is guided to the lip rear-side portion 44 can be guided to the position P3 lying higher than the rear edge 29 of the front opening portion 25 by the rear projecting portion 47. By doing so, the running air is allowed to flow around the rear edge 29 of the front opening portion 25, and hence, the running air that is guided to the lip rear-side portion 44 can be restrained from striking or flowing against the rear edge 29 of the front opening portion 25 to generate collision noise.

Figure 10:
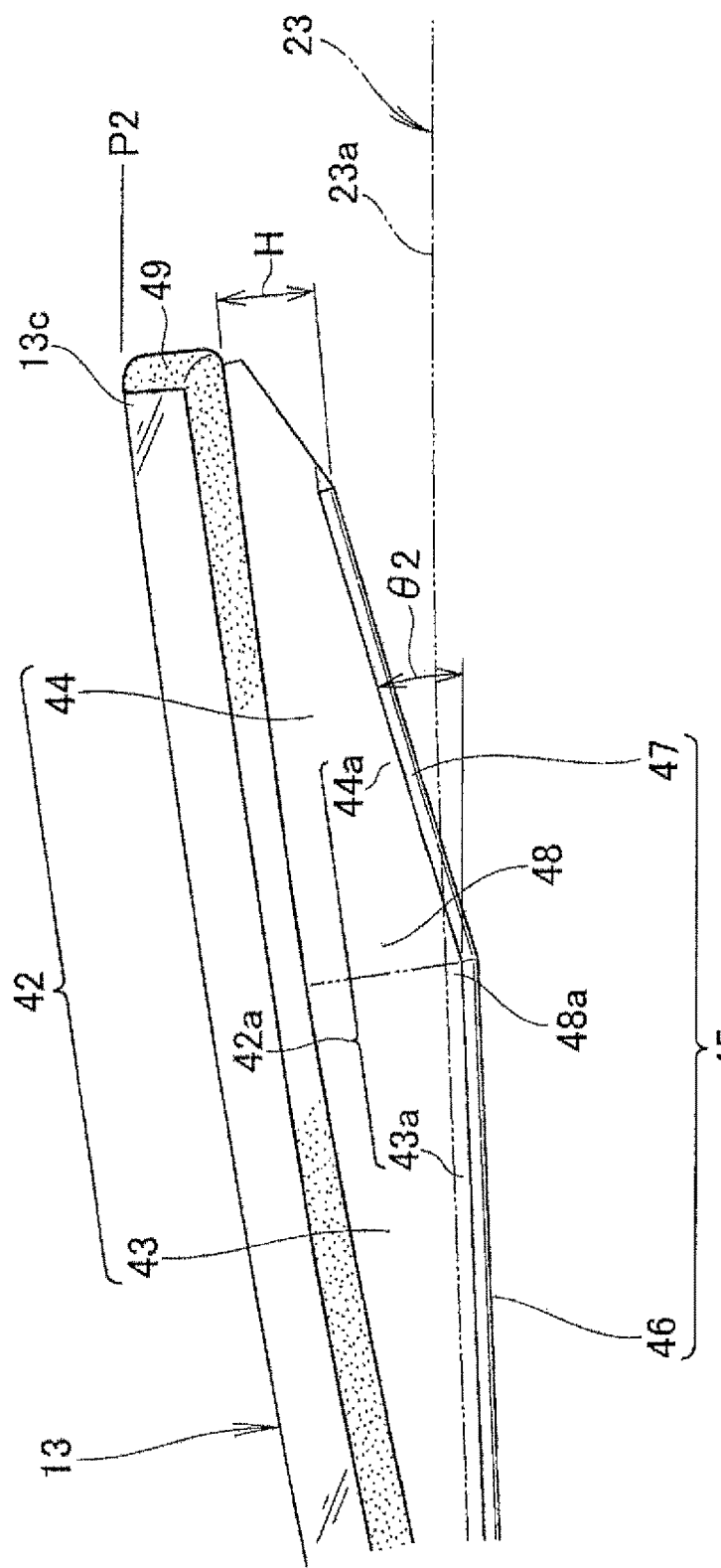
FIG. 10 is an enlarged view of a portion denoted by reference numeral 10 in FIG. 7.

As shown in FIG. 10, when the movable roof 13 is in the tilt-up state, the rear lower end 44*a* of the lip rear-side portion 44 extends upwards along the rising gradient of the inclined angle θ2, thereby making it possible to suppress an increase in the height-wide dimension H of the lip rear-side portion 44 preferably.

Figure 11:
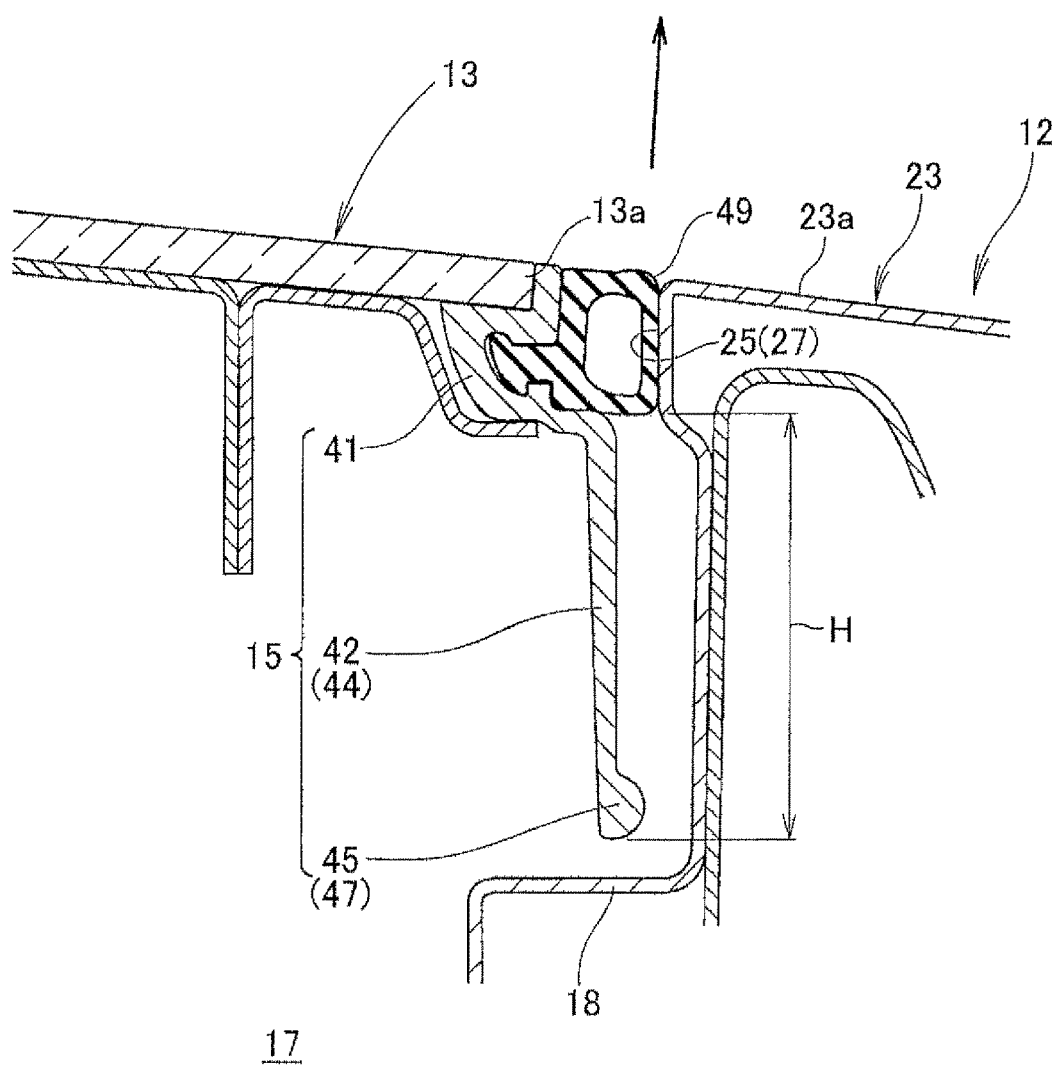
FIG. 11 is a sectional view taken along a line 11-11 in FIG. 4.

Thus, as shown in FIGS. 4, 11, when the movable roof 13 is closed to the closed position P1, the lip rear-side portion 44 can be prevented from intruding largely into the passenger compartment 17 side. This can prevent the interference of the lip rear-side portion 44 with a frame material 18 of the roof 12.

In addition, since the frame material 18 can be disposed in a high position in the passenger compartment 17, the riding comfort can be enhanced by ensuring a large space in the passenger compartment 17.

Returning to FIG. 10, when the rear end portion 13*e* of the movable roof 13 is opened to the open position P2, the front lower end 43*a* of the lip front-side portion 43 extends substantially horizontally and the rear lower end 44*a* of the lip rear-side portion 44 extends upwards along the rising gradient of the inclined angle θ2.

Thus, a lower end portion 48*a* of a boundary portion 48 between the lip front-side portion 43 and the lip rear-side portion 44 is formed into an angular shape (in other words, an edge shape, a corner shape) that projects downwards at the boundary portion 48. Namely, the lower end portion 48*a* of the boundary portion 48 is formed into a corner portion in such a way as to project downwards.

Owing to this, it is considered that vibrations are generated at the boundary portion 48 as a result of running air being received by the boundary portion 48 where the angular shape is formed.

Then, the projecting portion 45 is caused to project (that is, protrude) transversely outwards from the lower end 42*a* of the lip main body 42. Thus, the projecting portion 45 is provided to extend along the front lower end 43*a* of the lip front-side portion 43 and the rear lower end 44*a* of the lip rear-side portion 44.

The lower end portion 48*a* of the boundary portion 48 is reinforced by the projecting portion 45, whereby the rigidity of the boundary portion 48 (in particular, the lower end portion 48*a*) is enhanced. By doing so, when running air is received by the boundary portion 48 where the angular shape (the edge shape) is formed, it is possible to restrain the boundary portion 48 from being vibrated by the running air.

Further, by forming the lower end portion 48*a* of the boundary portion 48 into the angular shape, for example, with no projecting portion 45 being provided at the boundary portion 48, running air that reaches the boundary portion 48 tends to flow easily away from the boundary portion 48. Owing to this, wind noise tends to easily be generated at the boundary portion 48.

Then, the projecting portion 45 is provided to extend along the front lower end 43*a* of the lip front-side portion 43 and the rear lower end 44*a* of the lip rear-side portion 44. Thus, running air that reaches the boundary portion 48 can be received by the projecting portion 45.

As a result of this, running air can be prevented from flowing away from the boundary portion 48 by the projecting portion 45, thereby making it possible to suppress the generation of wind noise at the boundary portion 48.

Further, as shown in FIG. 5, when the movable roof 13 is disposed in the open position P2, the lip front-side portion 43 protrudes further downwards than the upper surface 23*a* of the roof main body 23. Thus, the lower end portion 48*a* of the boundary portion 48 that is formed into the angular shape can be disposed below the upper surface 23*a* of the roof main body 23.

By doing so, running air that flows along the upper surface 23*a* of the roof main body 23 is allowed to flow around the lower end portion 48*a* of the boundary portion 48 that is formed into the angular shape so as to prevent the running air from flowing against the lower end portion 48a. By causing the running air to flow around the lower end portion 48a, the generation of wind noise at the boundary portion 48 can be suppressed in a better fashion.

As shown in FIGS. 6, 11, the left side lip 15 is provided to be apart from the roof 12 with the movable roof 13 staying between the closed position P1 (refer to FIG. 4) and the open position P2 (refer to FIG. 2).

Namely, the left side lip 15 is kept in a non-contact state relative to the roof 12 (specifically, the left side edge 27 of the front opening portion 25). Thus, when opening or closing the movable roof 13 in a direction indicated by an arrow, it is possible to suppress the generation of frictional resistance between the left side lip 15 and the left side edge 27. This can reduce the operation force required to open or close the movable roof 13 to a lower level.

Further, unlike the prior art sunroof structure, the left side lip 15 does not have to be kept in the non-contact state relative to the guide groove in the roof 12 while being accommodated in the guide groove.

This prevents the left side lip 15 from being restricted in shape by the guide groove, thereby making it possible to enhance the flexibility in designing the same.

Figure 12A:
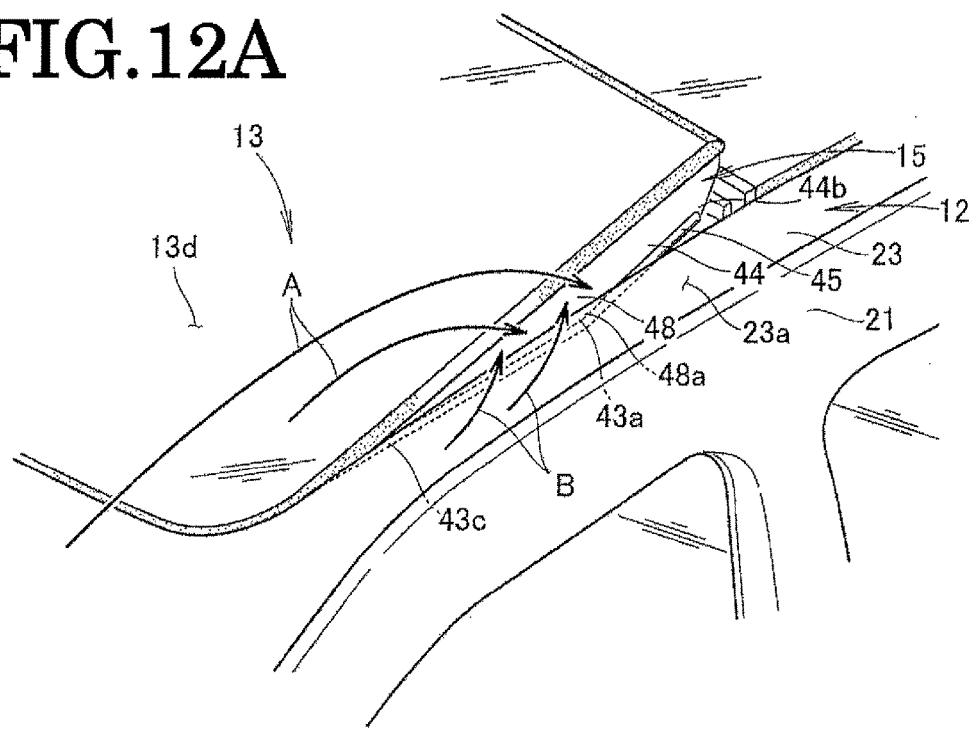
FIGS. 12A and 12B are diagrams describing an example in which the sunroof structure for a wheeled vehicle (a left side lip) according to the invention receives running air.
Figure 12B:
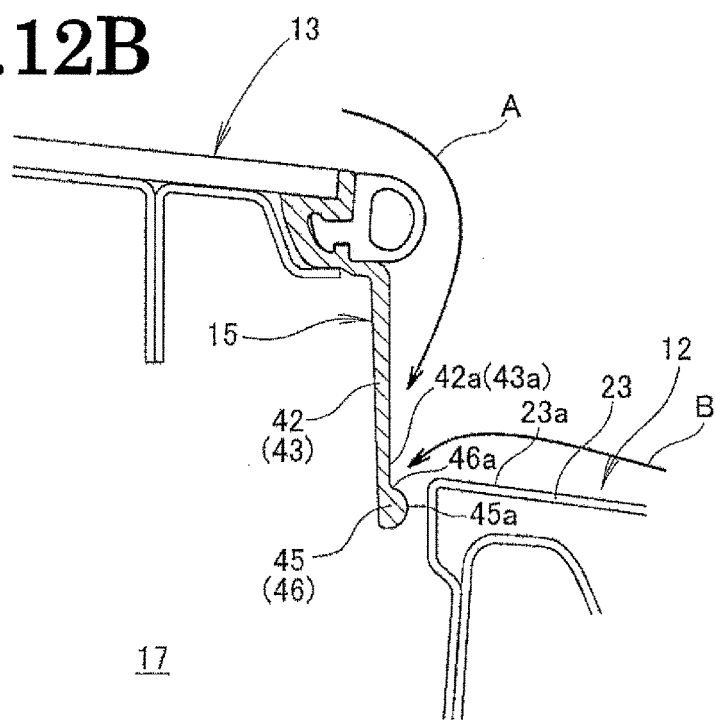

Next, an example in which running air generated while the vehicle Ve is running is received by the left side lip 15 will be described based on. FIGS. 12A and 12B.

As shown in FIG. 12A, running air that flows in a direction indicated by an arrow A from the upper surface 13d of the movable roof 13 towards the left side lip 15 is received by the left side lip 15.

Similarly, running air that flows in a direction indicated by an arrow B from the upper surface 23a of the roof main body 23 towards the left side lip 15 is received by the left side lip 15.

As shown in FIG. 12B, running air that flows to the left side lip 15 as indicated by an arrow A and running air that flows to the left side lip 15 as indicated by an arrow B is received by the lip front-side portion 43 of the left side lip 15.

The running air that is received by the lip front-side portion 43 is received by the upper surface 46a of the front projecting portion 46. By adopting this configuration, the running air that is received by the lip front-side portion 43 can be prevented from flowing around into the passenger compartment 17 side from the front lower end 43a of the lip front-side portion 43 by the front projecting portion 46, thereby making it possible to suppress the generation of wind noise preferably.

Here, the projecting surface 45a of the projecting portion 45 is formed smoothly so as to have a substantially curved section. Thus, running air that is guided to the projecting portion 45 is allowed to flow smoothly along the projecting surface 45a of the projecting portion 45.

By doing so, the running air guided to the projecting portion 45 can be prevented from flowing away from the projecting surface 45a, whereby it is possible to suppress the generation of wind noise by the running air that is guided to the projecting portion 45.

Further, as shown in FIG. 12A, the projecting portion 45 is provided so as to extend continuously from the front end 43c of the front lower end 43a to the rear end 44b of the rear lower end 44a. Thus, the rigidity of the left side lip 15 is enhanced by the projecting portion 45.

By doing so, it is possible to suppress the generation of self-excited vibration in the left side lip 15 by the running air that flows to the left side lip 15 as indicated by the arrow A and the running air that flows to the left side lip 15 as indicated by the arrow B as shown in FIG. 12B.

This can suppress the generation of vibration noise that would otherwise be caused by the self-excited vibration that would otherwise be generated in the left side lip 15.

In addition, as shown in FIG. 12A, the lower end portion 48a of the boundary portion 48 is formed into the angular shape. The rigidity is enhanced as a result of the lower end portion 48a being reinforced by the projecting portion 45.

By doing so, it is possible to suppress the generation of vibration in the boundary portion 48 by the running air that flows to the left side lip 15 as indicated by the arrow A and the running air that flows to the left side lip 15 as indicated by the arrow B.

Next, an example in which running air generated while the vehicle Ve is running is caused to flow around the rear edge 29 of the front opening portion 25 will be described based on FIG. 13.

Figure 13:
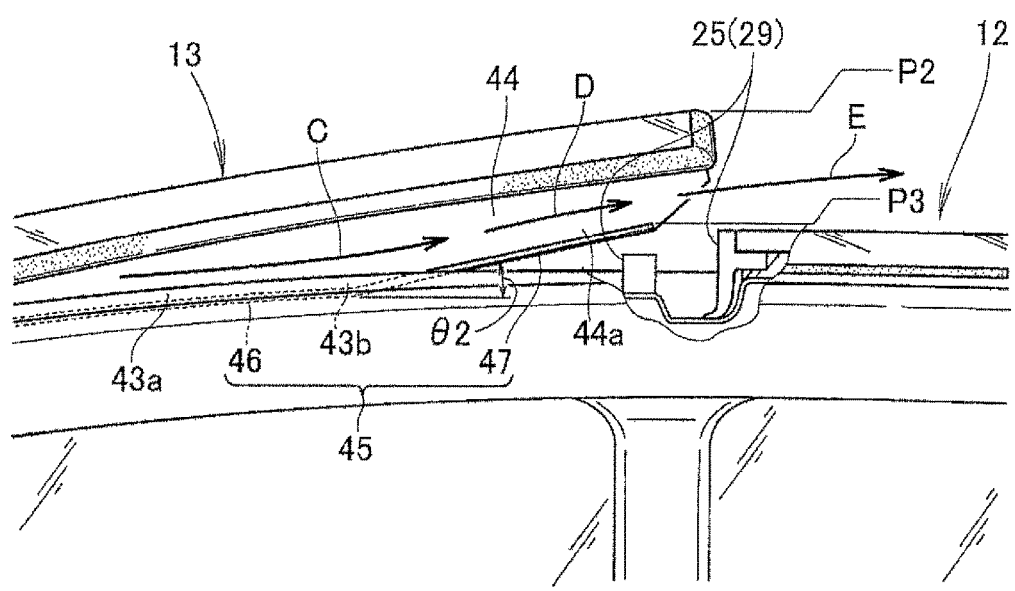
FIG. 13 is a diagram describing an example in which running air is caused to flow around a rear edge of a front opening portion by the sunroof structure for a wheeled vehicle (the left side lip) according to the invention.

As shown in FIG. 13, when the movable roof 13 is opened to the open position P2, the rear projecting portion 47 extends continuously from the rear end 43b of the front lower end 43a to the position P3 that lies higher than the rear edge 29 of the front opening portion 25 along the rising gradient of the inclined angle θ2. The rear projecting portion 47 is provided at the rear lower end 44a of the lip rear-side portion 44.

Thus, running air that is guided to the lip rear-side portion 44 as indicated by an arrow C can be guided to the position P3 lying higher than the rear edge 29 of the front opening portion 25 as indicated by an arrow D by the rear projecting portion 47. This enables the running that is guided to the lip rear-side portion 44 to flow around the rear edge 29 of the front opening portion 25 upwards of the rear edge 29 as indicated by an arrow E.

In this way, the running air is allowed to flow upwards of the rear edge 29, whereby the running air that is guided to the lip rear-side portion 44 can be restrained from striking or flowing against the rear edge 29 of the front opening portion 25 to generate collision noise.

The sunroof structure for a wheeled vehicle according to the invention is not limited to the embodiment that has been described heretofore and hence can be modified or improved as required.

For example, in the embodiment, while the left side lip 15 is described as being provided so as to be spaced apart from the roof 12 when the movable roof 13 is in both the closed state and the tilt-up state, the invention is not limited thereto.

For example, it is possible to provide the left side lip 15 in such a way that the left side lip 15 is brought into contact with the roof 12 when the movable roof 13 is in the closed state while the left side lip 15 is spaced apart from the roof 12 only when the movable roof 13 is in the tilt-up state.

In addition, in the embodiment, while the movable roof 13 is described as being the glass sunroof, the invention is not limited thereto. Thus, the movable roof 13 can be a steel roof.

Further, in the embodiment, while the front lower end 43a of the lip front-side portion 43 is described as extending substantially horizontally in the longitudinal direction of the vehicle body when the movable roof 13 is in the tilt-up state, the invention is not limited thereto.

For example, although the front lower end 43a does not extend completely horizontally in the longitudinal direction of the vehicle body, the whole of the front lower end 43a should be disposed below the upper surface 23a of the roof main body 23 when the movable roof 13 is in the tilt-up state.

Further, the shapes and configurations of the wheeled vehicle, the sunroof structure for a wheeled vehicle, the roof, the movable roof, the left and right side lips, the roof main body, the front opening portion, the rear edge of the front opening portion, the lip main body, the lip front-side portion, the lip rear-side portion, the projecting portion, the projecting surface, the front projecting portion and the rear projecting portion that are described in the embodiment are not limited to those described therein but can be modified as required.

INDUSTRIAL APPLICABILITY

The invention is preferably applied to a motor vehicle that includes a sunroof structure for a wheeled vehicle in which an opening portion is provided in a roof of the wheeled vehicle, a movable roof is provided in the opening portion, and the opening portion can be opened and closed by the movable roof.

DESCRIPTION OF REFERENCE NUMERALS AND CHARACTERS

Ve wheeled vehicle
10 sunroof structure for wheeled vehicle
12 roof (fixed roof)
13 movable roof
13a, 13b left and right side portions (transverse side portions) of movable roof
15, 16 left and right side lips (side lips)
23 roof main body
23a upper surface of roof main body (upper surface of roof)
25 front opening portion (opening portion)
29 rear edge of front opening portion
42 lip main body
42a lower end of lip main body
43 lip front-side portion
43a front lower end
43b rear end of front lower end
43c front end of front lower end
44 lip rear-side portion
44a rear lower end
44b rear end of rear lower end
45 projecting portion
45a projecting surface
46 front projecting portion
46a upper surface of front projecting portion (upper surface of projecting portion)
47 rear projecting portion
P3 position higher than rear edge of front opening portion

The invention claimed is:

1. A sunroof structure for a wheeled vehicle, comprising:
a fixed roof that forms a top portion of the wheeled vehicle;
a movable roof that opens and closes an opening portion which is provided in the fixed roof; and
a side lip that is provided on a transverse side portion of the movable roof and is spaced apart from the fixed roof when the movable roof is in a tilt-up state,
wherein the side lip comprises:
a main body that protrudes downwards from the transverse side portion of the movable roof; and
a projecting portion that projects transversely outwards from a lower end of the lip main body,
wherein the lip main body protrudes further downwards than an upper surface of the fixed roof when the movable roof is in the tilt-up state, and
wherein in the projecting portion, an upper surface of the projecting portion is situated below the upper surface of the fixed roof when the movable roof is in the tilt-up state.

2. The sunroof structure for the wheeled vehicle according to claim 1,
wherein in the projecting portion,
a transversely outer side projecting surface is formed smoothly to have a substantially curved section.

3. The sunroof structure for the wheeled vehicle according to claim 1,
wherein the lip main body comprises:
a lip front-side portion that has a front lower end which extends substantially horizontally in a longitudinal direction of a vehicle body when the movable roof is in the tilt-up state; and
a lip rear-side portion that has a rear lower end which extends from a rear end of the front lower end towards the rear of the vehicle body and upwards along a rising gradient when the movable roof is in the tilt-up state, and
wherein the projecting portion is provided to extend along the front lower end and the rear lower end.

4. The sunroof structure for the wheeled vehicle according to claim 3,
wherein in the lip front-side portion, the rear end of the front lower end is situated below the upper surface of the fixed roof when the movable roof is in the tilt-up state.

5. The sunroof structure for the wheeled vehicle according to claim 3,
wherein the projecting portion is provided continuously from a front end of the front lower end to a rear end of the rear lower end.

6. The sunroof structure for the wheeled vehicle according to claim 3,
wherein the projecting portion has a rear projecting portion which is provided on the rear lower end, and
wherein the rear projecting portion extends continuously from the rear end of the front lower end to a position where lies higher than a rear edge of the opening portion when the movable roof is in the tilt-up state.

7. A sunroof structure for a wheeled vehicle, comprising:
a fixed roof that forms a top portion of the wheeled vehicle;
a movable roof that opens and closes an opening portion which is provided in the fixed roof; and
a side lip that is provided on a transverse side portion of the movable roof and is spaced apart from the fixed roof when the movable roof is in a tilt-up state,
wherein the side lip comprises:
a main body that protrudes downwards from the transverse side portion of the movable roof; and
a projecting portion that projects transversely outwards from a lower end of the lip main body,
wherein in the projecting portion, a transversely outer side projecting surface is formed smoothly to have a substantially curved section.

8. The sunroof structure for the wheeled vehicle according to claim 7,
wherein the lip main body comprises:
a lip front-side portion that has a front lower end which extends substantially horizontally in a longitudinal direction of a vehicle body when the movable roof is in the tilt-up state; and
a lip rear-side portion that has a rear lower end which extends from a rear end of the front lower end towards the rear of the vehicle body and upwards along a rising gradient when the movable roof is in the tilt-up state, and wherein the projecting portion is provided to extend along the front lower end and the rear lower end.

9. The sunroof structure for the wheeled vehicle according to claim 8, wherein in the lip front-side portion, the rear end of the front lower end is situated below an upper surface of the fixed roof when the movable roof is in the tilt-up state.

10. The sunroof structure for the wheeled vehicle according to claim 8, wherein the projecting portion is provided continuously from a front end of the front lower end to a rear end of the rear lower end.

11. The sunroof structure for the wheeled vehicle according to claim 8, wherein the projecting portion has a rear projecting portion which is provided on the rear lower end, and wherein the rear projecting portion extends continuously from the rear end of the front lower end to a position where lies higher than a rear edge of the opening portion when the movable roof is in the tilt-up state.

* * * * *